US008796953B2

(12) United States Patent
Wiegele et al.

(10) Patent No.: US 8,796,953 B2
(45) Date of Patent: Aug. 5, 2014

(54) DC CONVERTER AND METHOD FOR SELECTING A FREQUENCY OF SAME

(75) Inventors: Stefan Wiegele, Graz (AT); Thomas Jessenig, Graz (AT); Peter Trattler, Graz (AT)

(73) Assignee: ams AG, Unterpremstätten (AT)

( * ) Notice: Subject to any disclaimer, the term of this patent is extended or adjusted under 35 U.S.C. 154(b) by 63 days.

(21) Appl. No.: 13/639,489

(22) PCT Filed: Apr. 4, 2011

(86) PCT No.: PCT/EP2011/055201
§ 371 (c)(1),
(2), (4) Date: Dec. 14, 2012

(87) PCT Pub. No.: WO2011/124549
PCT Pub. Date: Oct. 13, 2011

(65) Prior Publication Data
US 2013/0076264 A1 Mar. 28, 2013

(30) Foreign Application Priority Data
Apr. 7, 2010 (DE) .......................... 10 2010 014 103

(51) Int. Cl.
*H05B 37/02* (2006.01)
(52) U.S. Cl.
USPC .......................... 315/297; 315/307; 363/165
(58) Field of Classification Search
USPC .................. 315/291, 294, 297, 307; 363/165
See application file for complete search history.

(56) References Cited

U.S. PATENT DOCUMENTS

| 5,469,349 | A | 11/1995 | Marinus |
| 5,587,683 | A | 12/1996 | Kawasaki et al. |
| 5,757,631 | A | 5/1998 | Semmler |
| 6,275,018 | B1 | 8/2001 | Telefus et al. |
| 8,242,704 | B2 * | 8/2012 | Lethellier ..................... 315/276 |
| 2005/0237001 | A1 | 10/2005 | Hayafuji |
| 2007/0159421 | A1 * | 7/2007 | Peker et al. ..................... 345/82 |
| 2009/0251934 | A1 * | 10/2009 | Shteynberg et al. ............ 363/81 |
| 2010/0134079 | A1 | 6/2010 | Liu et al. |
| 2011/0157141 | A1 | 6/2011 | Woo et al. |

FOREIGN PATENT DOCUMENTS

DE 19522956 A1 1/1997

* cited by examiner

*Primary Examiner* — Jason M Crawford
(74) *Attorney, Agent, or Firm* — McDermott Will & Emery LLP

(57) ABSTRACT

In one embodiment, a DC converter has a frequency adjusting device with a frequency selection circuit, a frequency changeover switch (17), a frequency generator (18), a threshold signal generator (19), a state machine (20) and a unit (21) for providing a ready signal (S3). The frequency selection circuit has an output (15), at which a control signal (S5) is provided, which is set up to select a frequency of the switching frequency signal (DCLK) of the DC converter. The invention further relates to a method for selecting a frequency of the DC converter.

11 Claims, 2 Drawing Sheets

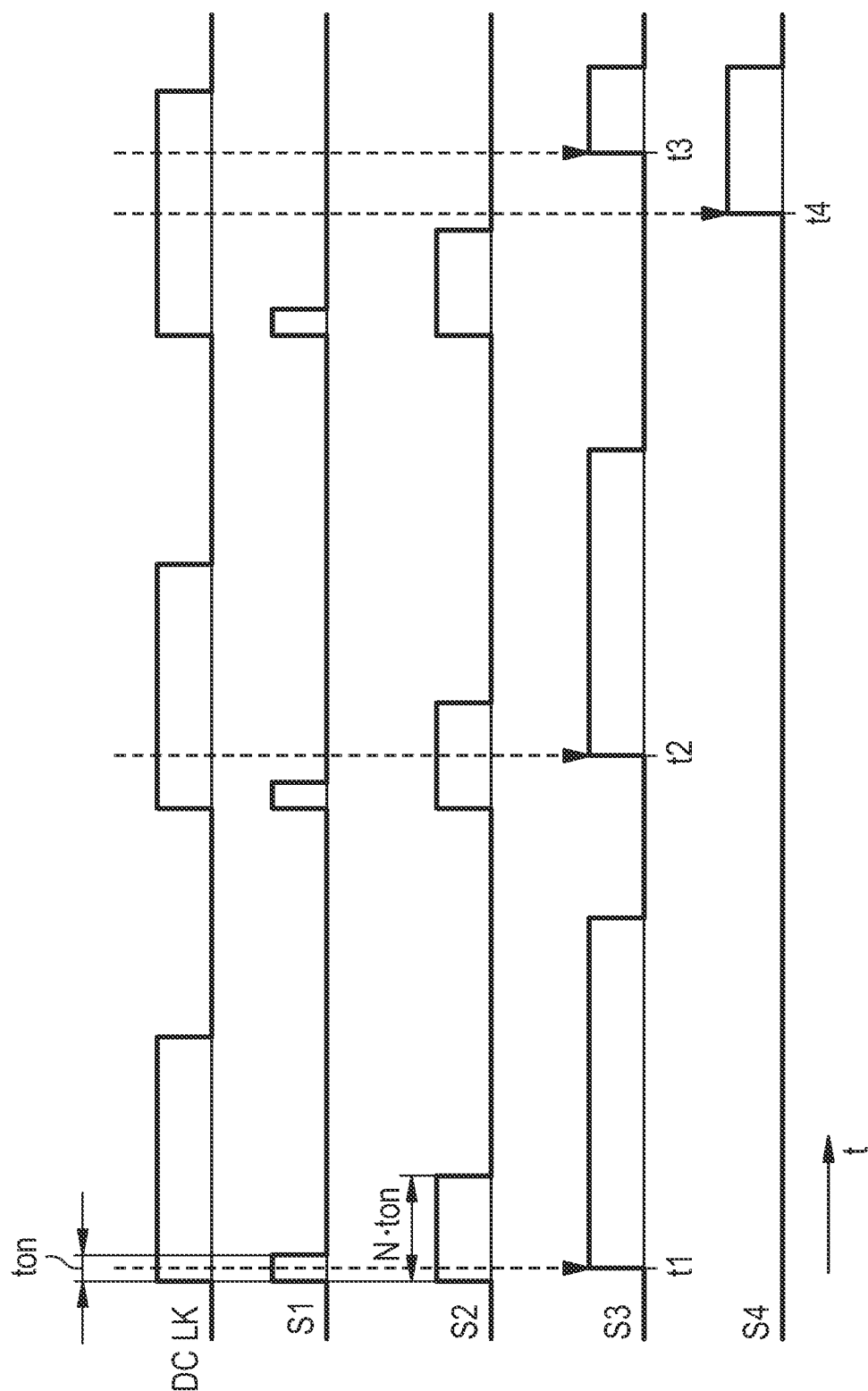

DC CONVERTER AND METHOD FOR SELECTING A FREQUENCY OF SAME

Figure 1:
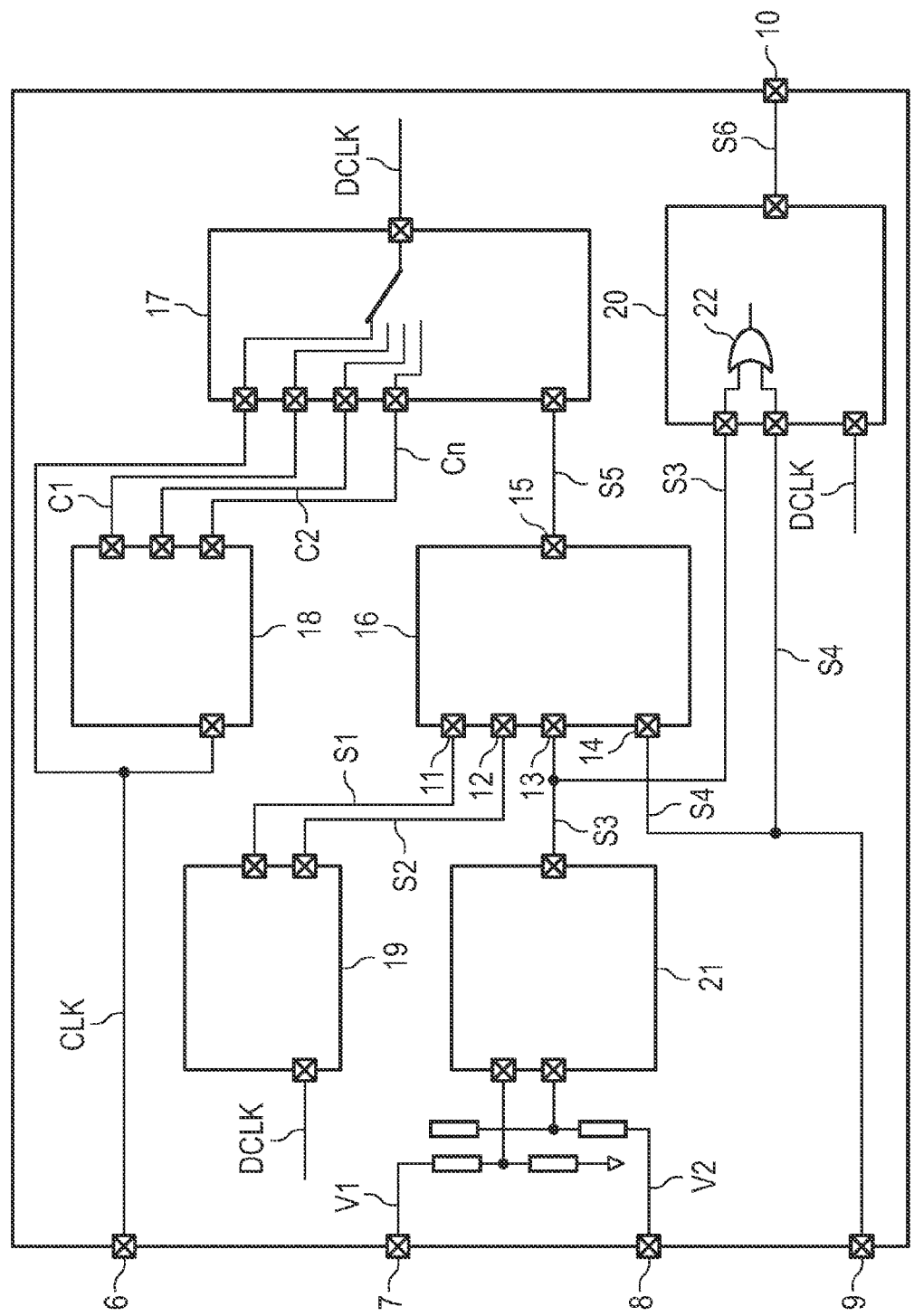

The invention pertains to a DC converter and a method for selecting a frequency of a DC converter.

In the control of a DC converter, namely a so-called DCDC converter, different options are available for adjusting a desired output voltage or a desired output current by means of a corresponding control of the required switching times, i.e., on and off switching electronic switches such as, for example, transistors of the DC converter. For example, control of the electronic switches is realized by means of a pulse-width modulated signal, PWM signal, with constant frequency, in which the on/off time or the so-called duty cycle is variable. Another option is a hysteresis control that is based on the two-step control principle. This control causes the output voltage of a DC converter to remain within a specified upper and lower limit. The upper and the lower limit respectively specify a switching time.

When selecting a control method, the respective utilization of the DC converter, in particular, is the decisive factor. For example, the voltages generated by the DC converter are subject to different requirements in the control of light-emitting diodes or LEDs than in the control of organic light-emitting diodes or OLEDs. Evidentially, OLED-based displays, particularly so-called Active Matrix OLED or AMOLED displays are sensitive to a ripple of the control voltage at low currents. The ripple of the control voltage leads to flickering of the display. Since the efficiency of OLED displays is particularly high at low currents, a flicker-free control is particularly desirable in this range.

Known control circuits for OLEDs are based on a pulse-width modulated DC converter, in which individual pulses of the PWM signal are skipped in a so-called skip mode. This results in an undefined frequency at the output of the DC converter that causes the display to flicker, particularly at low currents.

Similar problems arise in the control of OLED displays by means of DC converters with hysteresis control because widely varying frequencies also occur at the output in this case and cause the display to flicker.

It is therefore an objective to realize an improvement of the frequency response at the output of a DC converter, i.e., to reduce, for example, a ripple at the output of the DC converter.

This objective is attained with the subject matter of the independent claims. Enhancements and embodiments form the respective objects of the dependent claims.

In one embodiment, a DC converter comprises a frequency adjusting device with a frequency selection circuit. The DC converter is designed for supplying a display device with organic light-emitting diodes or an active matrix display device with organic light-emitting diodes.

The frequency selection circuit comprises a first input, a second input, a third input and an output. A first threshold signal is supplied to the first input in dependence on a switching frequency signal of the DC converter. A second threshold signal is supplied to the second input in dependence on the first threshold signal. A ready signal of the DC converter is supplied to the third input. A control signal is provided at the output in dependence on the first threshold signal, the second threshold signal and the ready signal. The control signal is designed for selecting a frequency of the switching frequency signal of the DC converter.

The frequency adjusting device further comprises a frequency change-over switch, a frequency generator, a threshold signal generator, a state machine and a unit for providing the ready signal in dependence on a first and a second voltage provided by the DC converter. The frequency change-over switch is coupled to the output of the frequency selection circuit. A main clock signal of the DC converter, a first clock signal with a first clock frequency and at least one second clock signal with a second clock frequency are supplied to the frequency change-over switch. The frequency change-over switch is designed for providing the switching frequency signal of the DC converter in dependence on the control signal, the first and/or the at least one second clock signal. The main clock signal is supplied to the frequency generator. The frequency generator is designed for providing the first and the at least one second clock signal. The switching frequency signal of the DC converter is supplied to the threshold signal generator. The threshold signal generator is adapted for respectively providing the first and the second threshold signal in dependence on the switching frequency signal. The state machine, to which the ready signal and the switching frequency signal are supplied, is designed for providing a driving signal for the DC converter. The driving signal is provided in dependence on the switching frequency signal and the ready signal.

The first threshold signal is supplied in dependence on the switching frequency signal of the DC converter. The second threshold signal is supplied in dependence on the first threshold signal. In addition, the ready signal of the DC converter is supplied to the frequency selection circuit. The frequency selection circuit provides the control signal at its output in dependence on the first and the second threshold signal, as well as the ready signal. The control signal specifies the selection of a frequency of the switching frequency signal.

The frequency generator generates the first and the at least one second clock signal from the supplied main clock signal by means of frequency division. The main clock signal is provided by a superordinate system, in which the frequency adjusting device is operated. The frequency of the main clock signal is the maximum frequency of the frequency adjusting device. Consequently, the first and the second clock frequency are lower than the frequency of the main clock signal.

The threshold signal generator generates the first and the second threshold signal that are respectively clocked to the switching frequency signal. The second threshold signal comprises pulses with a width, i.e., a duration, that is adapted to a multiple of the minimal on-time of the DC converter. The first and the second threshold signal, as well as the ready signal that is provided in dependence on the first and the second voltage of the DC converter, are evaluated in the frequency selection circuit. The control signal is provided accordingly and supplied to the frequency change-over switch. The frequency change-over switch selects between the main clock signal, the first clock signal and the second clock signal depending on the information of the control signal. The selected signal is applied to the output of the frequency change-over switch and provided as a switching frequency signal. The switching frequency signal is supplied to the state machine and therefore defines the frequency of the driving signal. The driving signal is designed for controlling the electronic switches of the DC converter.

Since a frequency of the switching frequency signal of the DC converter is selected by means of the control signal, the DC converter advantageously is always operated with a defined fixed frequency. In this way, an otherwise occurring low-frequency ripple at the output of the DC converter is advantageously reduced.

The driving signal advantageously always has a fixed, well-defined frequency, namely either the frequency of the main clock signal, the first clock frequency or the second clock frequency. It is therefore ensured that the first and the second voltage of the DC converter are also provided without low-frequency fluctuations, i.e., without a so-called ripple, at low currents.

The switching frequency signal preferably comprises a clock signal of the DC converter. Consequently, it essentially defines the operating frequency of the DC converter. The frequency of the switching frequency signal is the frequency used for controlling electronic switches of the DC converter. The electronic switches serve for switching over between a charging mode and a discharging mode of energy storage components of the DC converter such as, e.g., an inductor. A voltage provided by the DC converter consequently is a function of a voltage supplied to the DC converter and the switching frequency signal.

The first and the second threshold signal preferably are respectively synchronous to the switching frequency signal of the DC converter. The frequency of the first and the second threshold signal therefore respectively corresponds to the frequency of the switching frequency signal. The ready signal is provided, for example, in dependence on a current through an inductor of the DC converter. An impulse of the ready signal indicates, for example, that the inductor is about fully charged. The DC converter used in this case typically consists of an inductive DC converter.

The first and the second threshold signal and the ready signal are digital signals, particularly binary signals that assume the state logic 1 or the state logic 0. An impulse of a signal characterizes state logic 1.

In an enhancement, the first threshold signal is a function of a minimal on-time of the DC converter.

The first threshold signal comprises impulses, the durations of which are adapted to a minimal on-time of the DC converter. The minimal on-time of the DC converter is proportional to the reaction time of the current control of the DC converter. For example, it lies around 50 ns. The second threshold signal is a function of a scalar multiple of the minimal on-time of the DC converter. The scalar multiple is, for example, a fractional rational multiple. The minimal on-time of the DC converter therefore defines the width of the pulses of the first and the second threshold signal.

In another embodiment, the control signal is designed for reducing the frequency of the switching frequency signal of the DC converter if an impulse of the ready signal occurs during an impulse of the first threshold signal.

In this case, an energy storage component of the DC converter is already charged during the minimal on-time.

Consequently, the frequency of the DC converter is reduced with the aid of the control signal if the ready signal switches to logic 1 before the first threshold signal switches to 0. The switching frequency signal therefore is switched to a next lower frequency. It is preferred to specify a quantity of firmly predefined frequencies of the switching frequency signal.

In another embodiment, the control signal is designed for maintaining the frequency of the switching frequency signal of the DC converter if an impulse of the ready signal occurs during an impulse of the second threshold signal.

If the ready signal switches to logic 1 while the second threshold signal is simultaneously at logic 1, the control signal is provided in such a way that the frequency of the switching frequency signal of the DC converter is not changed. The DC converter already operates in the desired range.

In an enhancement, the control signal is designed for increasing the frequency of the switching frequency signal of the DC converter if an impulse of the ready signal occurs after an impulse of the second threshold signal.

In this case, the energy storage component of the DC converter is not completely charged.

If the ready signal only switches to logic 1 after the first threshold signal and the second threshold signal have once again switched to logic 0 within one clock period of the switching frequency signal, the frequency of the switching frequency signal is increased with the aid of the control signal. This increase means a change-over to a firmly defined next higher frequency.

In another embodiment, the frequency selection circuit comprises a fourth input, to which an overload protection signal of the DC converter is supplied. In this embodiment, the control signal is designed for adjusting a maximum frequency of the switching frequency signal of the DC converter if an impulse of the overload protection signal occurs.

If a current jump occurs that may be caused, for example, by a change-over of an OLED display from black to white, the current through the inductor of the DC converter reaches a limit. In this case, the overload protection signal switches from logic 0 to logic 1. This impulse is evaluated by the frequency selection circuit, whereupon the control signal is provided in such a way that the frequency of the switching frequency signal is adjusted to a maximum.

In an enhancement, the overload protection signal is supplied to the state machine. The driving signal is provided in dependence on the overload protection signal.

The overload protection signal is additionally evaluated in the state machine. For example, the ready signal and the overload protection signal are coupled by means of a logic OR function. The driving signal is provided accordingly.

In another embodiment, the frequency adjusting device is designed for a DC converter with an inductor, wherein the DC converter is designed for generating the first and the second voltage.

The DC converter comprises, for example, exactly one coil.

In an enhancement, the frequency adjusting device is designed for operating a display device with organic light-emitting diodes.

The frequency adjusting device advantageously makes it possible to operate an OLED-based display device with very high efficiency because noise at the output of the DC converter is minimized due to the selection of respectively fixed frequencies for the operation of the display device.

Since the DC converter is operated with the defined frequencies of the frequency adjusting device, only these frequencies appear at the output of the DC converter that therefore has no low-frequency fluctuations. Consequently, flickering of the supplied display device is reduced or prevented.

The display device is also referred to as a display. The active matrix display device is also referred to as an active matrix display.

In one embodiment, a method for selecting a frequency of a DC converter comprises the following steps:
  supplying a first threshold signal in dependence on a switching frequency signal of the DC converter,
  supplying a second threshold signal in dependence on the first threshold signal,
  supplying a ready signal of the DC converter,
  providing a control signal in dependence on the first threshold signal, the second threshold signal and the ready signal, and
  selecting a frequency of the switching frequency signal in dependence on the control signal.

The control signal is generated by evaluating the first and the second threshold signal, as well as the ready signal. The frequency of the switching frequency signal is controlled accordingly.

Since the switching frequency signal always has a defined frequency, the frequency response at the output of the DC converter operated with the switching frequency signal is improved. The selected frequency also appears at the output of the DC converter.

In an enhancement, the selection of the frequency of the switching frequency signal is realized in a debounced fashion.

In this context, debounced means that an event, i.e., a pulse of the ready signal, does not immediately trigger a change of the frequency of the switching frequency signal when it occurs for the first time, but rather only if this event is still present after a certain period of time. The debouncing is comparable to conventional debouncing, for example, in the evaluation of keystrokes on a keyboard.

In this way, it is advantageously prevented that the switching frequency signal is continuously switched back and forth between two frequencies.

An exemplary embodiment of the invention is described in greater detail below with reference to the figures. In this respect, circuit components and signals with identical function or action are identified by the same reference symbols.

In these figures:

FIG. 1 shows an exemplary embodiment of a frequency adjusting device with a frequency selection circuit according to the proposed principle, and FIG. 2 shows corresponding signal diagrams.

FIG. 1 shows an exemplary embodiment of a frequency adjusting device with a frequency selection circuit according to the proposed principle. The frequency adjusting device comprises a terminal 6 that is supplied with a main clock signal CLK of a DC converter, a terminal 7 that is supplied with a first voltage V1 of the DC converter, a terminal 8 that is supplied with a second voltage V2 of the DC converter, a terminal 9 that is supplied with an overload protection signal S4 of the DC converter and a terminal 10, at which a driving signal S6 for the DC converter is provided. In addition, the frequency adjusting device comprises the frequency selection circuit 16, a frequency change-over switch 17, a frequency generator 18, a threshold signal generator 19, a state machine 20 and a unit 21 for providing a ready signal.

The frequency generator 18 comprises an input for supplying the main clock signal CLK, as well as outputs for providing a first clock signal C1, a second clock signal C2 and an additional clock signal Cn. The frequency generator 18 respectively generates the clock signals C1, C2, Cn by means of frequency division. For example, the first clock signal C1 has a first clock frequency that corresponds to one-half of the frequency of the main clock signal CLK. The second clock signal C2 has a second clock frequency that corresponds, for example, to one-fourth of the frequency of the main clock signal CLK. The additional clock signal Cn is a clock frequency, for example, that corresponds to the nth part of the frequency of the main clock signal CLK.

The frequency change-over switch 17 is coupled to the output of the frequency generator 18 and comprises a terminal for supplying the main clock signal CLK, a terminal for supplying the first clock signal C1, a terminal for supplying the second clock signal C2 and a terminal for supplying the additional clock signal Cn. The frequency change-over switch 17 also comprises a terminal for supplying a control signal S5. The frequency change-over switch 17 furthermore comprises an output for providing a switching frequency signal DCLK. The frequency change-over switch changes over between the supplied clock signals CLK, C1, C2 and Cn as a function of the control signal S5. The respectively selected clock signal is provided as switching frequency signal DCLK with the corresponding frequency.

The switching frequency signal DCLK generated by the frequency change-over switch 17 is supplied to the input side of the threshold signal generator 19. The threshold signal generator 19 comprises a terminal for providing a first threshold signal S1 and another terminal for providing a second threshold signal S2. The threshold signal generator 19 generates the first threshold signal S1 in dependence on the switching frequency signal DCLK and the second threshold signal S2 in dependence on the first threshold signal S1 such that the first and the second threshold signals S1, S2 are respectively clocked with the frequency of the switching frequency signal DCLK.

In this case, the width of an impulse of the first threshold signal S1 is adapted to a minimal on-time of the DC converter. A so-called duty cycle respectively results from the ratio between the minimal on-time of the DC converter and the period of the switching frequency signal DCLK. A pulse width of the second threshold signal S2 is adapted to a multiple of the minimal on-time of the DC converter. For example, the pulse width of the second threshold signal S2 amounts to double the pulse width of the first threshold signal S1.

The frequency selection circuit 16 comprises a first input 11 that is supplied with the first threshold signal S1, a second input 12 that is supplied with the second threshold signal S2, a third input 13 that is supplied with a ready signal S3 of the DC converter and a fourth input 14 that is supplied with an overload protection signal S4. The frequency selection circuit 16 furthermore comprises an output 15 for providing the control signal S5. The frequency selection circuit 16 generates the control signal S5 in dependence on the first threshold signal S1, the second threshold signal S2, the ready signal S3 and/or the overload protection signal S4. The control signal S5 is provided in the form of a digital signal that comprises at least two bits. For example, the information "increase frequency," "maintain frequency," "decrease frequency" or "adjust maximum frequency" is transmitted by means of the control signal S5.

The unit 21 for providing the ready signal S5 is supplied with a first input signal that is proportional to the first voltage V1 of the DC converter via a first terminal and with a second input signal that is proportional to the second voltage V2 of the DC generator via a second terminal. The ready signal S3 is provided at an output of the unit 21. In this case, the ready signal S3 is generated in such a way that a change-over from logic 0 to logic 1 takes place as soon as the unit 21 detects that the charging cycle is completed. The ready signal S3 switches back from logic 1 to logic 0 if this inductor discharges again.

The state machine 20 is supplied with the switching frequency DCLK via a terminal. The ready signal S3 and the overload protection signal S4 are respectively supplied via other terminals. The driving signal S6 is provided at an output of the state machine 20. A frequency of the driving signal S6 is adapted to a frequency of the switching frequency signal DCLK. The ready signal S3 and the overload protection signal S4 are evaluated in the state machine 20 by means of an OR function 22. This respectively triggers a change of state in the state machine 20. The driving signal S6 is designed for controlling electronic switches of the DC converter.

The switching frequency signal DCLK is provided by the frequency change-over switch 17 with the frequency of the main clock signal CLK or the frequency of the first clock signal C1 or the frequency of the second clock signal C2 or the frequency of the additional clock signal Cn with the aid of the frequency selection circuit 16. The frequency of the switching frequency signal DCLK defines the frequency of the driving signal S6 that controls the switches of the DC converter. Consequently, the first and the second voltage V1, V2 are provided without so-called ripple, i.e., without low-frequency fluctuations. Only the defined frequencies of either the main clock signal CLK, the first clock frequency, the second clock frequency or the nth clock frequency occur at the output of the DC converter operated with the frequency adjusting device.

It is therefore advantageously possible to also operate a connected display on the basis of organic LEDs without flickering when displaying dark images, in the range of which OLED-based displays have a very high efficiency. In addition, the electromagnetic compatibility is significantly improved due to the limited number of frequencies used.

FIG. 2 shows signal diagrams of the exemplary embodiment according to FIG. 1. Each line shows the characteristics of one respective signal as a function of the time t. The first line shows the characteristics of the switching frequency signal DCLK. The second line shows the characteristics of the first threshold signal S1. The width of a pulse of the first threshold signal S1 corresponds to the minimal on-time ton as described above. The third line shows the characteristics of the second threshold signal S2. In this case, the pulse width of the second threshold signal amounts to a multiple of the pulse width of the first threshold signal ton and is identified by n*ton in the drawing. This figure clearly shows that the first and the second threshold signal S1, S2 are respectively synchronous to the switching frequency signal DCLK, i.e., they have the same frequency. The fourth line shows the characteristics of the ready signal S3. The fifth line contains the characteristics of the overload protection signal S4.

At a first time t1, a pulse of the ready signal S3 occurs during a pulse of the first threshold signal S1. This means that the inductor of the connected DC converter is already charged during the minimal on-time ton. Consequently, the frequency of the switching frequency signal DCLK is reduced.

At a second time t2, another impulse of the ready signal S3 occurs. The second time t2 lies after the end of a pulse of the first threshold signal S1, i.e., when the first threshold signal S1 has already changed to logic 0 again while the second threshold signal S2 is still at logic 1. This means that the connected DC converter operates in the desired range. Consequently, the frequency of the switching frequency signal DCLK is maintained.

At a third time t3, an impulse of the ready signal S3 occurs. The third time t3 lies after the pulse of the second threshold signal S2, signifying that the inductor of the connected DC converter could not be charged during a multiple of the minimal on-time n*ton. The frequency of the switching frequency signal DCLK is increased accordingly by means of the control signal S5. This causes the duty cycle to increase.

At a fourth time t4, an impulse of the overload protection signal S4 occurs. This corresponds to a current jump in the inductor of the connected DC converter. The current through the inductor reaches an upper limit in this case. This occurs, for example, when changing over a connected OLED display from black to white. In order to counteract overcharging of the inductor, the frequency of the switching frequency signal DCLK consequently is switched to the highest available frequency. For example, the highest available frequency is the frequency of the main clock signal.

All frequency changes triggered in response to events at the times t1 to t3 usually take place in a debounced fashion, i.e., only if the same event occurs at least a second time. In this way, a repeated change-over between different frequencies is prevented. Only the reaction to an impulse of the overload protection signal S4 usually takes place directly.

Consequently, only certain defined frequencies advantageously occur at the output of a connected DC converter. The ripple of the voltages provided by the DC converter is significantly reduced. Consequently, a connected OLED display can be operated in a flicker-free fashion, particularly in the low current range.

List of Reference Symbols

6, . . . , 15 Terminal
16 Frequency selection circuit
17 Frequency change-over switch
18 Frequency generator
19 Threshold signal generator
20 State machine
21 Unit
22 OR function
C1, C2, Cn Clock signal
CLK Main clock signal
DCLK Switching frequency signal
S1, S2 Threshold signal
S3 Ready signal
S4 Overload protection signal
S5 Control signal
S6 Driving signal
t1, . . . , t4 Time
ton On-time
V1, V2 Voltage

What is claimed is:

1. A DC converter comprising:
 a frequency adjusting device comprising:
  a frequency selection circuit, comprising
   a first input that is supplied with a first threshold signal in dependence on a switching frequency signal of the DC converter,
   a second input that is supplied with a second threshold signal in dependence on the first threshold signal,
   a third input that is supplied with a ready signal of the DC converter, and
   an output, at which a control signal is provided that is designed for selecting a frequency of the switching frequency signal of the DC converter;
  a frequency change-over switch that is coupled to the output of the frequency selection circuit and that is supplied with a main clock signal of the DC converter, a first clock signal with a first clock frequency and at least one second clock signal with a second clock frequency, wherein said frequency change-over switch is designed for providing the switching frequency signal of the DC converter in dependence on the control signal, the first and/or the at least one second clock signal;
  a frequency generator that is supplied with the main clock signal and is designed for providing the first and at least the at least one second clock signal;
  a threshold signal generator that is supplied with the switching frequency signal of the DC converter and is adapted for respectively providing the first and the second threshold signal in dependence on the switching frequency signal;
  a state machine that is supplied with the ready signal and the switching frequency signal and is designed for providing a driving signal for the DC converter; and a unit for providing the ready signal in dependence on a first and a second voltage provided by the DC converter, wherein the control signal is provided in dependence on the first threshold signal, the second threshold signal and the ready signal, wherein the driving signal is provided in dependence on the switching frequency signal and the ready signal, and wherein the DC converter is designed for supplying a display device with organic light-emitting diodes or an active matrix display device with organic light-emitting diodes.

2. The DC converter according to claim 1, wherein the first threshold signal is a function of a minimal on-time of the DC converter.

3. The DC converter according to claims 1 or 2, wherein the control signal is designed for decreasing the frequency of the switching frequency signal of the DC converter if an impulse of the ready signal occurs during an impulse of the first threshold signal.

4. The DC converter according to one of claim 1, wherein the control signal is designed for maintaining the frequency of the switching frequency signal of the DC converter if an impulse of the ready signal occurs during an impulse of the second threshold signal.

5. The DC converter according to claim 1, wherein the control signal is designed for increasing the frequency of the switching frequency signal of the DC converter if an impulse of the ready signal occurs after an impulse of the first threshold signal and after an impulse of the second threshold signal.

6. The DC converter according to claim 1, further comprising a fourth input that is supplied with an overload protection signal of the DC converter, wherein the control signal is designed for adjusting a maximum frequency of the switching frequency signal of the DC converter if an impulse of the overload protection signal occurs.

7. The DC converter according to claim 1, wherein the state machine is supplied with the overload protection signal and the driving signal is provided in dependence on the overload protection signal.

8. The DC converter according to claim 1, wherein the frequency adjusting device is designed for a DC converter with an inductor, and wherein the DC converter is designed for generating the first and the second voltage.

9. A method for selecting a frequency of a DC converter, comprising:

supplying a first threshold signal in dependence on a switching frequency signal of the DC converter;

supplying a second threshold signal in dependence on the first threshold signal;

supplying a ready signal of the DC converter;

providing a control signal in dependence on the first threshold signal, the second threshold signal and the ready signal; and selecting a frequency of the switching frequency signal in dependence on the control signal.

10. The method according to claim 9, further comprising: supplying an overload protection signal, wherein the control signal is additionally provided in dependence on the overload protection signal.

11. The method according to claims 9 or 10, wherein the selection of the frequency of the switching frequency signal takes place in a debounced fashion.

* * * * *

UNITED STATES PATENT AND TRADEMARK OFFICE
CERTIFICATE OF CORRECTION

| | |
|---|---|
| PATENT NO. | : 8,796,953 B2 |
| APPLICATION NO. | : 13/639489 |
| DATED | : August 5, 2014 |
| INVENTOR(S) | : Stefan Wiegele et al. |

It is certified that error appears in the above-identified patent and that said Letters Patent is hereby corrected as shown below:

IN THE CLAIMS:

In Column 9, Line 21

Replace "according to one of claim 1", with --according to claim 1--.

Signed and Sealed this
Twenty-fifth Day of November, 2014

Michelle K. Lee
*Deputy Director of the United States Patent and Trademark Office*